No Printed Specification Available
9158X
H. Ault,
Washing Machine,
Patented Oct. 14, 1835.
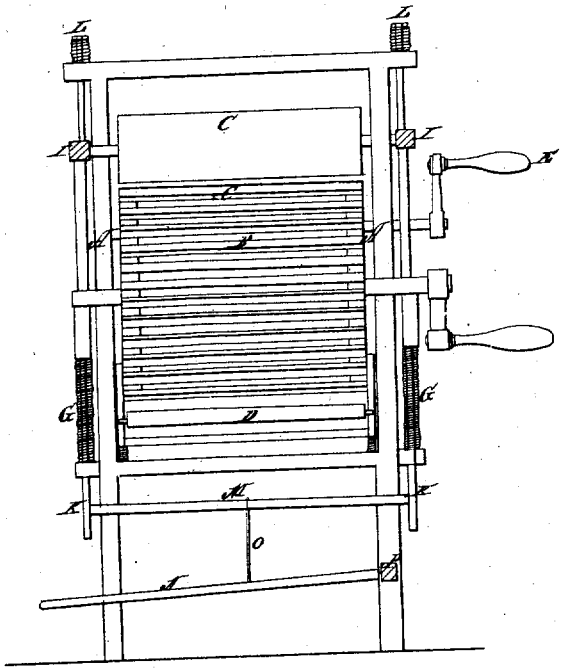
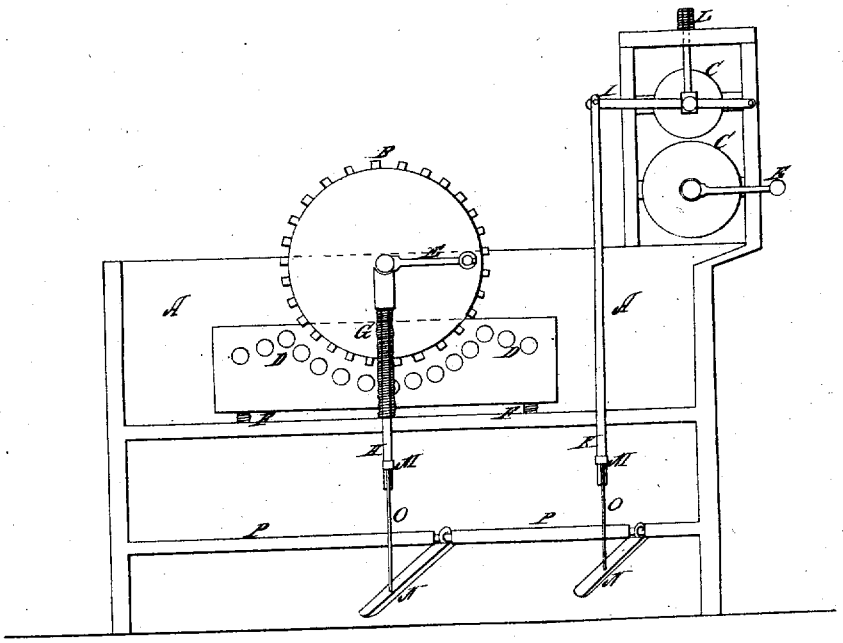
N. PETERS, PHOTO-LITHOGRAPHER, WASHINGTON, D. C.

Henry Ault of Philadelphia. Tennessee.

Letters Patent.

The schedule referred to in these Letters Patent and making
part of the same, containing a description in the words of the
said Henry Ault, himself of his improvement in the
Washing Machine —
To all to whom these presents shall come
Be it known that I Henry Ault of Philadelphia in the
County of Monroe and State of Tennessee, have invented
a new and useful improvement in the washing Machine
and that the following is a full and exact description of
the construction and operation of the said Machine as in-
vented and improved by me, It consists of four principal
parts, viz a box, a segment of a circle of rollers in a sepa
-rate frame, a cylinder wheel of slats and a a press formed
of two rollers and their arms, The box is made of thick
plank and 3 feet 6 inches long in the clear and about
18 or twenty inches wide about 11 inches deep and about
24 inches high to the bottom the end pieces extend down
for the feet the cylinder of slats is fifteen inches high
and about 16 inches long and is made by first cutting two
round wheels of inch and half plank, around which slats
are nailed The slats to be three fourths of an inch thick
and half an inch apart; These slats being fastened to each
wheel form the cylinder, Through this cylinder or wheel
is an axle upon which it turns and is suspended by mo
veable supports and by wire springs of spiral shape fastened
to the sides of the box by two pieces being nailed to the same
with holes through them through which the two upright sup
-ports pass through the springs up to the axle, — The springs are
made of strong wire & are so bent as to leave a space the entire length for the support as above mentioned. The segment of a circle of rollers is formed of fifteen which are as long as the cylinder of Slats above, the rollers are 1 1/8 inch in diameter turning on large wire pivots, nine of which are placed so as to fit the size of the wheel 3 on each to be placed in an inclined slope so as to roll the clothes off into the water at each side of the segment. The rollers are 1/8 of an inch apart and the segment is placed immediately under the cylinder on four wire springs made as above described leaving a space of one inch between; — The clothes to be washed are placed on the front end of the segment against the wheel, the press is formed, of two rollers placed in upright pieces fastened to the end of the box. They are in length equal to the width of the box. The lower roller is eight inches in diameter and turns on pivots 2 1/2 inches in diameter & revolves always at the same point. The crank is fastened to the lower roller, The top roller is five inches in diameter (and turns on pivots 1½ inches in diameter) and is suspended above the lower one by two wire springs fastened to the top of the upright pieces in which the rollers turn but may be easily forced down upon the clothes by means of a treadle fastened to two arms or levers about fifteen inches long by small upright pieces fasten-ed to the longest end of the levers, the lever bearing down upon the centre of the top roller about 3 inches from the end of the arms, — Operation, The clothes being pla=ced on the segment of rollers and presented to the cylinder of Slats, the foot is pressed on the treadle attached thereto which counteracts the spring and causes the clothes to be slightly pressed, then on turning the crank of the cylinder the clothes are drawn through and thus cleansed, The clothes are then presented to the pressing roller and by bearing the foot on the pressing treadle and turning the crank attached to the undermost roller, the water is pressed out of the clothes as they pass off from the Machine on to
a table or bench fastened to the machine to receive them

What I claim as my invention and for which I solicit Letters Patent, is the application of the springs under the shoulders of the moveable supports, the cylinder of slats, the supports themselves, the treadle and coupling bar for depressing x the cylinder on the Clothes on the segment of rollers and the treadle, levers or arms of the pressing cylinder which operate downwards —

Witnesses

Edward Badlam Junr. } Henry Ault
Norman Shelden }

Ex
C.J.W.

1000

Patented October 14, 1835.

Drawing

Spec 90 words